No. 733,792. PATENTED JULY 14, 1903.
J. W. ALTMYER.
METALLIC POST.
APPLICATION FILED OCT. 27, 1902.
NO MODEL. 2 SHEETS—SHEET 1.

Witnesses
Jas. H. McCathran
H. F. Shepard

John W. Altmyer, Inventor
By C. G. Siggers
Attorney

No. 733,792. PATENTED JULY 14, 1903.
J. W. ALTMYER.
METALLIC POST.
APPLICATION FILED OCT. 27, 1902.
NO MODEL. 2 SHEETS—SHEET 2.

Witnesses
Jas. F. McLathran
H. S. Shepard.

John W. Altmyer, Inventor
By C. G. Siggers
Attorney

THE NORRIS PETERS CO., PHOTO-LITHO., WASHINGTON, D. C.

No. 733,792. Patented July 14, 1903.

UNITED STATES PATENT OFFICE.

JOHN W. ALTMYER, OF SPRINGVILLE, IOWA, ASSIGNOR OF ONE-HALF TO CYRUS FISHER, OF CENTRAL CITY, IOWA.

METALLIC POST.

SPECIFICATION forming part of Letters Patent No. 733,792, dated July 14, 1903.

Application filed October 27, 1902. Serial No. 129,009. (No model.)

*To all whom it may concern:*

Be it known that I, JOHN W. ALTMYER, a citizen of the United States, residing at Springville, in the county of Linn and State of Iowa, have invented a new and useful Metallic Post, of which the following is a specification.

This invention relates to posts, and has for its object to provide an improved metallic post of skeleton or open-work structure, so as to combine ornamentation or attractiveness with strength and utility.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the appended claims without departing from the spirit or sacrificing any of the advantages of the invention.

Figure 1:
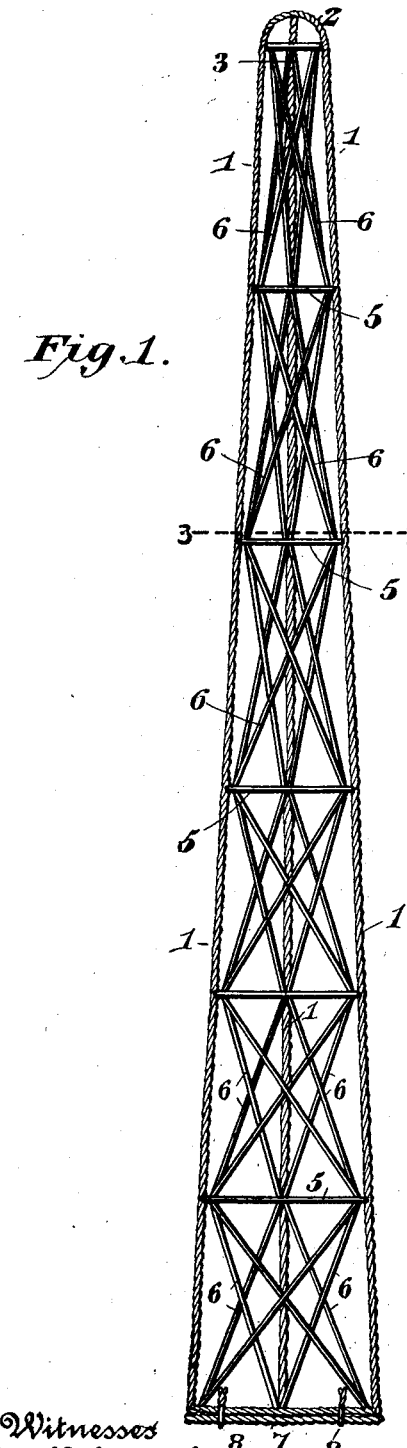
Figure 2:
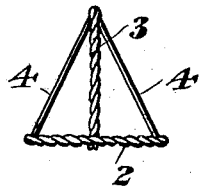
Figures 3, 9:
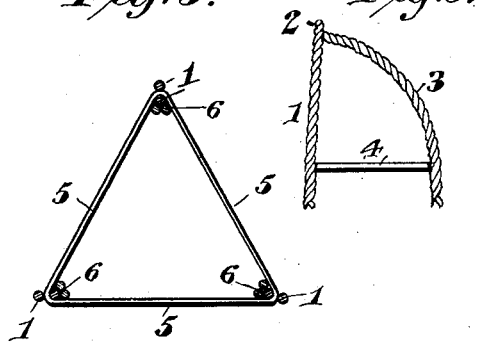
Figure 4:
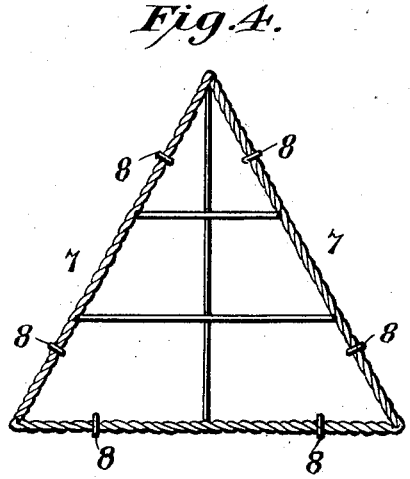
Figure 5:
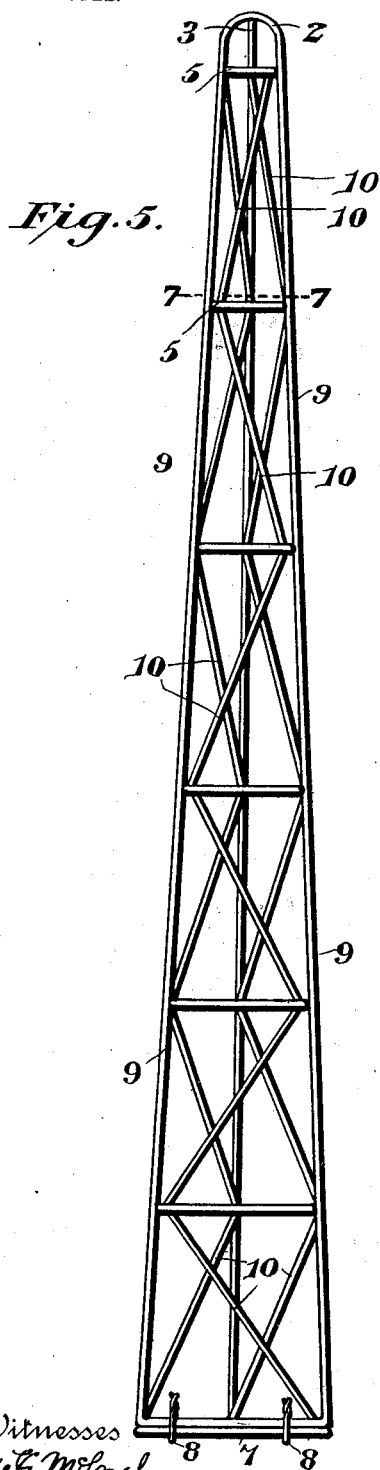
Figure 6:
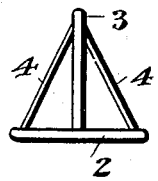
Figure 7:
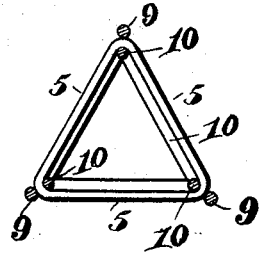
Figure 8:
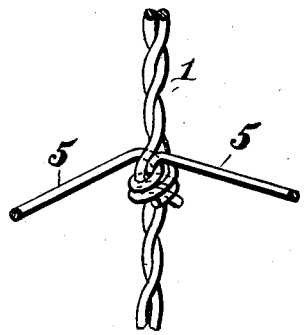

In the drawings, Figure 1 is an elevation of a post constructed and arranged in accordance with the present invention. Fig. 2 is a top plan view thereof. Fig. 3 is a sectional view on the line 3 3 of Fig. 1. Fig. 4 is a bottom plan view of the post. Fig. 5 is a side elevation of a modified form of the post. Fig. 6 is a top plan view thereof. Fig. 7 is a cross-sectional view on the line 7 7 of Fig. 5. Fig. 8 is a detail perspective view showing a form of connection between one of the upright members of the form of post shown in Fig. 1 and one of the horizontal brace-frames. Fig. 9 is a detail view of the top of the post.

Like characters of reference designate corresponding parts in all the figures of the drawings.

The form of post shown in Figs. 1 to 4, inclusive, is triangular in cross-sectional shape and is made up of three upwardly-converged upright or standard members 1, each of which is made up of twisted strands of wire. As best indicated in Figs. 1 and 2, it will be seen that two of these members are formed from the same length of wire—that is to say, a single long wire is bent intermediate of its ends to form the arched top portion 2, while the upper end of the other member is bowed over, as at 3, and connected in a suitable manner to an intermediate portion of the part 2. The upper ends of the members are furthermore connected by means of the substantially horizontal braces 4, lying at opposite sides of the part 3.

At suitable intervals throughout the length of the post there are substantially horizontal triangular brace-frames 5, which are preferably equilateral in shape and have their corners or vertexes secured to the respective upright members of the post, as plainly illustrated in Fig. 3 of the drawings. It will be noted that the brace-frames 5 are closer together near the lower end of the post than at the upper end thereof, as it is necessary to have the lower portion of the post more rigid than the upper part. The horizontal triangular brace-frames extend between the strands of the upright members and may be soldered or otherwise secured to the same, if desired.

The substantially rectangular portions formed by adjacent brace-frames and the upright members of the post are stiffened by means of crossed diagonal brace-rods 6, which extend between the diagonally opposite corners of said substantially rectangular portions, whereby the post is trussed upon each side and throughout its entire length.

When the posts are stored or in transportation, they are open at their bottom, whereby several of the posts may be nested, so as to occupy a comparatively small space.

Just prior to setting up the post the triangular bottom 7 is fitted thereto, as shown in Fig. 4. This bottom may be a metallic plate or of skeleton or open-work structure, as shown, and is connected to the sides of the lowermost brace-frame by means of open-wire links 8, which embrace the adjacent sides of the brace-frame and the bottom, with their ends twisted together, so as to prevent separation of the base from the post. The purpose of this base is to prevent sinking of the post or settling thereof after it has been set up.

The modification shown in Figs. 5, 6, and 7 consists in employing uprights 9, which are single metal rods instead of the twisted formation hereinbefore described, and instead of employing crossed braces a single brace 10 is employed, said braces extending in zigzag order from the lowermost brace-frame to the uppermost brace-frame. The horizontal triangular brace-frames are soldered, welded, or otherwise secured to the upright wires or members between the same and the ends of the diagonal braces.

In Fig. 8 there has been shown one form of means for connecting the triangular frames to the twisted upright members and consists in having the sides of each frame separate, with their ends inserted between the twisted strands at corresponding points, one wire being inserted from one side and the other from the opposite side, after which the wires are bent so as to form mutually-engaged hooked portions, and then the free ends of the wires are finally twisted upon the uprights.

What is claimed is—

1. A metallic post comprising corner-uprights, two of the uprights being constructed of a single piece of material bent between its ends to form a top connecting portion and one of the uprights having its upper end bent and secured to the said connecting portion between the ends thereof, and the top braces extending from the ends of the connecting portion to the latter upright, substantially as described.

2. A metallic post, comprising corner-uprights, two of which are formed from the same piece of metal which is bent intermediate of its ends to form an arched top, and one of the uprights having its upper end bowed and secured to an intermediate portion of the first-mentioned arched portion and side braces extending from the ends of the first-mentioned arched portion to the latter upright.

3. A hollow metallic post, comprising corner-uprights, substantially horizontal brace-frames located between and connected to the uprights, a skeleton bottom for the post, and wire loops embracing the sides of the bottom and the sides of the lowermost brace-frame and detachably securing the bottom to the post and permitting the said bottom to be removed to enable posts to be nested.

4. A hollow metallic post comprising corner-uprights, horizontal frames connecting the uprights, and diagonal braces arranged between the frames, the said parts being all constructed of wire, and the frames being arranged between wires at their points of attachment to the corner-uprights.

5. A hollow metallic post triangular in cross-section composed of three corner-uprights, two of the uprights being constructed of a continuous piece of material bent between its ends to form a connecting top portion, and the other upright being bent at its upper end and secured to the connecting top portion between the ends thereof, top horizontal braces extending from the latter upright to the ends of the said top connecting portion, horizontal braces connecting the uprights, diagonal braces arranged between the horizontal braces, the braces and the uprights being constructed of wire and the horizontal braces being located between the contiguous wires at their points of attachment to the uprights, and a removable bottom adapted to be detached to permit posts to be nested.

In testimony that I claim the foregoing as my own I have hereto affixed my signature in the presence of two witnesses.

JOHN W. ALTMYER.

Witnesses:
WM. E. BUNDY,
FRANK MIDDLETON.